United States Patent [19]

Gould

[11] 4,191,558
[45] Mar. 4, 1980

[54] SODIUM PURIFICATION APPARATUS AND METHOD

[75] Inventor: Marc I. Gould, Van Nuys, Calif.

[73] Assignee: Rockwell International Corporation, El Segundo, Calif.

[21] Appl. No.: 973,643

[22] Filed: Dec. 26, 1978

[51] Int. Cl.² .............................................. C22B 3/02
[52] U.S. Cl. ....................................... 75/66; 62/55.5; 176/37; 210/69; 210/187; 266/170
[58] Field of Search .............. 266/170; 75/66; 176/37; 62/55.5; 210/69, 187

[56] References Cited

U.S. PATENT DOCUMENTS

| | | | |
|---|---|---|---|
| 3,552,485 | 1/1971 | LeJannou | 62/55.5 |
| 3,618,770 | 11/1971 | Pohl | 176/37 |
| 3,693,959 | 9/1972 | Swinhoe et al. | 266/170 |
| 3,831,912 | 8/1974 | Shimoyashiki et al. | 75/66 |
| 3,873,447 | 3/1975 | Pohl | 210/187 |

Primary Examiner—M. J. Andrews
Attorney, Agent, or Firm—L. Lee Humphries; Henry Kolin; Clark E. DeLarvin

[57] ABSTRACT

An apparatus for and method of collecting and storing oxide impurities contained in high-temperature liquid alkali metal. A method and apparatus are provided for nucleating and precipitating oxide impurities by cooling, wherein the nucleation and precipitation are enhanced by causing a substantial increase in pressure drop and corresponding change in the velocity head of the alkali metal. Thereafter the liquid alkali metal is introduced into a quiescent zone wherein the liquid velocity is maintained below a specific maximum whereby it is possible to obtain high oxide removal efficiencies without the necessity of a mesh or filter.

9 Claims, 1 Drawing Figure

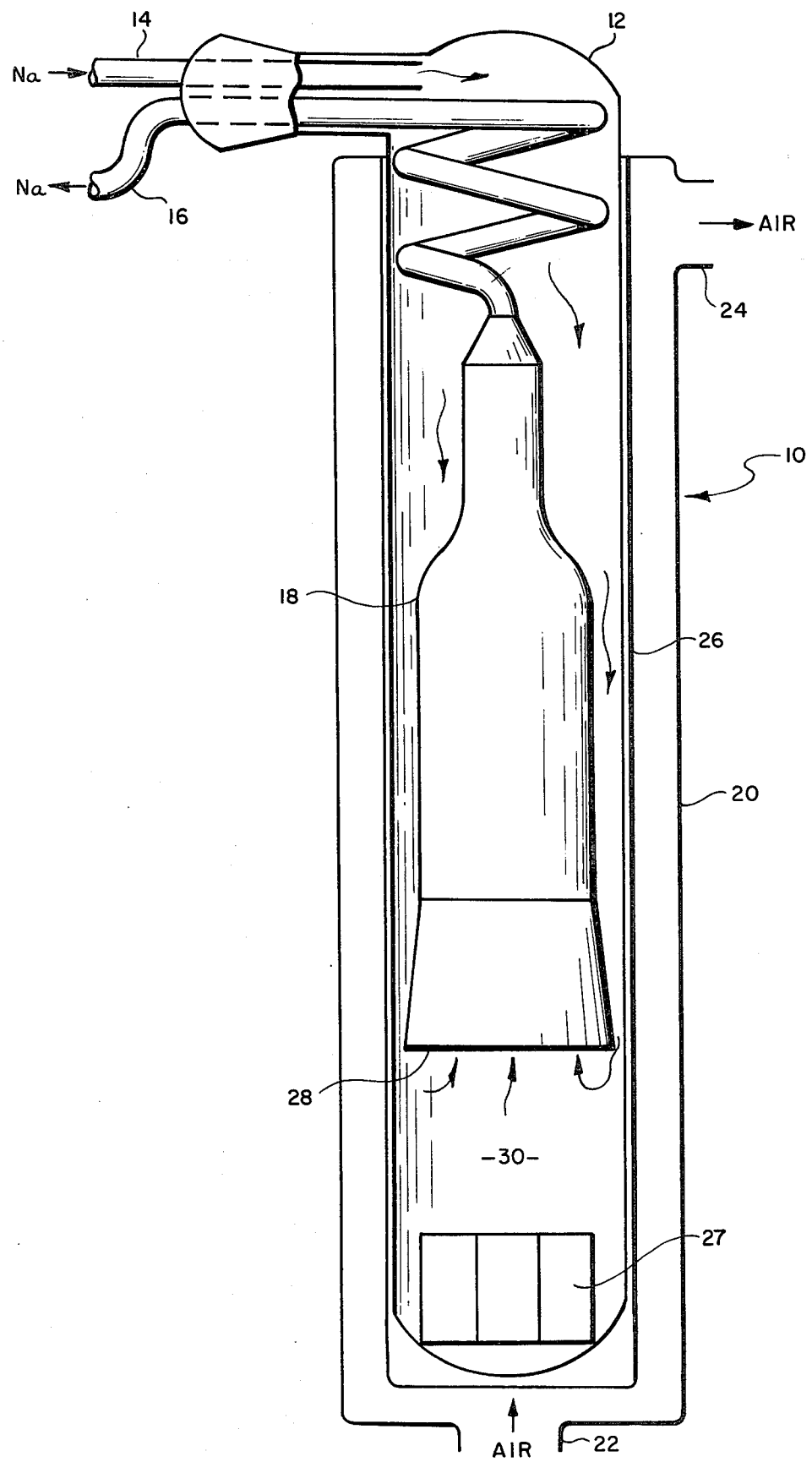

SODIUM PURIFICATION APPARATUS AND METHOD

The Government has rights in this invention pursuant to Contract No. DE-AM03-76-SF00700 awarded by the U. S. Department of Energy.

BACKGROUND OF THE INVENTION

1. Field of the Invention

This invention relates to liquid metal purification and more particularly to a device for and method of removing metal oxides from liquid alkali metals. It specifically relates to a sodium oxide trap wherein sodium oxide is precipitated and removed from a stream of liquid sodium.

2. Prior Art

Liquid metals, particularly the liquid alkali metals, have found wide use as heat transfer media. For example, sodium and mixtures of sodium and potassium are used as a heat transfer medium for use in conjunction with a central solar receiver. A problem encountered with the use of liquid alkali metals as heat transfer media is the formation of oxides by contamination with atmospheric oxygen or reaction with objects in contact with the liquid alkali metal. These oxides must be removed since they contribute to accelerated corrosion of the materials of construction. In addition, they tend to obstruct flow passages.

Heretofore the conventional device for removing, for example, sodium oxides from liquid sodium, was a cold trap which made use of the fact that the solubility of the oxide is proportional to temperature. The oxides are removed by lowering the temperature of a stream of liquid alkali metal to a temperature below the precipitation point of the liquid metal oxide but above the melting point of the liquid alkali metal. The metal oxides are then removed by filtration or entrapment with a metal mesh. The generally accepted basis for cold trap design has been to pack the trap with mesh. The mesh designs require careful control during operation to minimize the oxide concentration differential as well as the temperature differential across the mesh to prevent an excessive precipitation rate which could result in premature plugging of the mesh. In spite of the fact that many studies have been conducted in the United States and abroad in an effort to improve the design of cold traps and the understanding of their working, the use of a mesh has remained a key feature of cold trap design.

U.S. Pat. No. 3,558,122 discloses a mesh-type of liquid metal purifier. The device comprises a metal oxide collector, such as a mesh, to be immersed in a body of liquid metal, a heat exchanger outside the body of liquid metal, means for transferring heat from the metal oxide collector to the heat exchanger, and a moveable thermal barrier positioned around the metal oxide collector.

U.S. Pat. No. 3,693,959 shows yet another variation of a mesh-type cold trap for liquid metal. The device comprises a vessel and a cylindrical duct member arranged concentrically in the vessel. A flow of liquid metal from an inlet is directed into the vessel downwardly along the annular interspace defined between the duct member and the inner wall of the vessel, and then into the lower end of the vessel and upwardly through the duct member. The upper length of the duct member and liquid metal inlet end of the vessel is of a thermally conducting nature while the remaining length of the duct member towards the lower end of the vessel is of double wall construction so as to be of a thermally insulating nature. The duct member is provided with a filter to remove any precipitated particles which are carried over from the bottom of the vessel.

U.S. Pat. No. 3,831,912 discloses yet another form of cold trap utilizing a mesh. The mesh comprises a netlike member constructed of large meshes which are knitted with a plurality of fine wires and have a plurality of piled or stacked spaces between one net face and another net face opposing the first.

U.S. Pat. No. 3,618,770 discloses yet another type of cold trap utilizing a mesh. Patentees disclose that the effectiveness of a cold trap in nucleating and precipitating oxide impurities is increased by electromagnetic stirring of the cooled sodium. The electromagnetic stirring action is accomplished with a polyphase rotating magnetic field.

The disadvantage of all mesh-type traps is, of course, that the upstream surface of the mesh tends to become coated with the oxide precipitate, eventually plugging and blocking the flow. Obviously, therefore, there is need for an improved cold trap which would not require a mesh for efficient oxide removal.

SUMMARY OF THE INVENTION

The present invention provides for the removal of metal oxides from a liquid alkali metal without the necessity of maintaining small oxide concentration and temperature differentials, a filter or mesh, and a long residence time which is required by the prior art devices. The liquid alkali metal, containing oxide impurities, is introduced into a housing having a conduit member located therein. The alkali metal is caused to flow downwardly through an annular passageway defined by the housing and the conduit member. The flow through the annular passageway should be substantially laminar. Adjacent the terminal end of the conduit member there is provided a means for causing an abrupt change in velocity head with a corresponding pressure drop, thus, inducing turbulence in the flowing alkali metal. Concurrently, the outside of the housing is in direct heat exchange relationship with a cooling fluid whereby, as a result the cooling and the abrupt turbulent flow, the rate of nucleation and crystallization of the oxide impurities is greatly enhanced. A portion of the housing below the terminal end of the conduit member is provided with a sufficient volume to provide a substantially quiescent zone whereby the crystals precipitate and settle to the bottom of the housing. The alkali metal flows upwardly through the conduit member at a very low velocity such that substantially no solid precipitates are carried in the fluid stream. The alkali metal passing through the conduit member is in indirect heat exchange relationship with the alkali metal on the outside of the conduit member. The liquid alkali metal of reduced oxide content is removed from the housing.

BRIEF DESCRIPTION OF THE DRAWING

The invention will now be described by way of example with reference to the sole FIGURE in the accompanying drawing, which is a schematic longitudinal sectional view of a preferred embodiment of the present invention.

DESCRIPTION OF THE PREFERRED EMBODIMENT

Referring to the sole FIGURE, therein is depicted an apparatus of the present invention 10 for processing an alkali metal, such as sodium, to remove metal oxides therefrom. The apparatus comprises a housing 12 provided with a sodium inlet 14 and a sodium discharge tube 16. Located within housing 12 and in fluid communication with sodium discharge tube 16 is a conduit member 18. Housing 12 is surrounded by a chamber 20 provided with an inlet 22 and an outlet 24 for the introduction and discharge respectively of cooling fluid, such as air. Advantageously, the outer surface of housing 12 is provided with a plurality of longitudinal, radially extending fins 26 to enhance the transfer of heat from hot sodium flowing through chamber 20. Also located in housing 12, adjacent a lower portion thereof, there is optionally provided a baffle member 27 for the retention of precipitated oxides. Intermediate a terminal end 28 of conduit member 18 and the bottom of housing 12 there is provided a sufficient open or unrestricted volume to define a substantially quiescent or flow stagnation zone 30.

In operation, a hot liquid alkali metal such as sodium, containing an oxide impurity, is introduced into apparatus 10 through inlet 14. It will be appreciated that while the invention is being described with reference to alkali metals, which are the preferred liquid metal heat exchange media currently in use, it also would be applicable to the alkaline earth metals as well. Further, the liquid need not be a single alkali or alkaline earth metal, indeed in many instances a mixture such as sodium and potassium is used. However, for convenience the invention will be described with reference to a particularly preferred alkali metal, sodium. The liquid alkali metal introduced through inlet 14 generally will be at a temperature of from about 100° C. above its melting point up to about its boiling point. In the case of sodium, the temperature may be from about 200° to 600° C. and may contain metal oxide impurities in amounts of from as low as about 5 ppm up to as high as 200 ppm or higher. The concentration of impurities will of course be a function of the temperature, the selected alkali metal and the type of metal oxide present. Typically, the metal oxide impurity will be an oxide of the liquid alkali metal such as sodium oxide in the case of liquid sodium. It also will be appreciated by those versed in the art that the present invention is readily amenable to the removal of hydrides of the alkali metals as well as the oxides.

The liquid sodium flows through inlet 14 into housing 12 and then down through the annular passageway formed between conduit member 18 and housing 12. During its passage through the annular passageway, there should be no abrupt changes in cross-sectional flow path, since it is a key feature of the invention that substantially all of the pressure drop of the sodium passing through the annular passageway occurs at the terminal end 28 of conduit member 18. In addition, any abrupt change in cross-sectional flow area upstream of terminal end 28 could result in premature precipitation of oxides depending, of course, upon the temperature and concentration of oxides in the alkali metal. Preferably, the change in cross-sectional flow area across the terminal end 28 is such as to provide for a high change in velocity head; velocity head being equal to $V^2/2g$ where V is the velocity of the liquid alkali metal just upstream or downstream of the terminal end 28 of conduit member 18 and g is the acceleration of gravity.

Concurrently, with the flow of sodium through the annular flow path, a cooling fluid is introduced and passed through chamber 20 via inlet 22 and discharged via outlet 24. Generally, for obvious economic reasons, air is used as the cooling fluid. Generally, sufficient air will be introduced to cool the sodium to a temperature of about 120° C. It will be appreciated, of course, that the precise temperature to which the sodium is cooled will be both a matter of choice and a function of the quantity of contaminants present in the liquid sodium.

It is an essential feature of the present invention that adjacent the terminal end 28 of conduit member 18 there be provided a substantially abrupt change in cross-sectional flow path such that there is a change in the velocity head of in excess of about 80% and preferably in excess of about 90% across that point. In the preferred embodiment depicted in the drawing, the transition to the area of minimum cross-sectional flow area is tapered to maximize the fluid velocity and provide a maximum pressure drop at terminal end 28. The taper also aids in preventing any eddy currents upstream of terminal end 28 which might cause premature precipitation of crystals and possible plugging of the passageway. In accordance with the present invention, it has been found that this abrupt change in cross-sectional flow area, with a corresponding high pressure drop and the turbulence induced thereby, greatly enhances the rate of precipitation of oxide crystals.

Immediately downstream of terminal end 28 of conduit member 18 there is provided a large cross-sectional flow area and sufficient volume to provide for a substantially quiescent or flow stagnation area such that the liquid alkali metal flowing therethrough enters conduit member 18 at a very low velocity (a velocity of less than about 0.10 ft./sec. and preferably less than 0.05 ft./sec. for sodium) whereby the oxide crystals formed precipitate and settle to the bottom of the housing 12. Thus the metal oxide content of the sodium is substantially reduced. The sodium of reduced metal oxide content flows upwardly through conduit member 18 and out sodium discharge tube 16.

EXAMPLE

The following example is set forth to more fully illustrate the present invention. An apparatus was constructed substantially as depicted in the FIGURE. Housing 12 was substantially cylindrical in shape having an inside diameter of about 19 in. (483 mm) and an overall length of approximately 110 in. The portion of conduit member 18 upstream of terminal end 28 had a diameter of 13½ in. (343 mm) and tapered outwardly for a distance of about 12 in. to a diameter of 17 in. (432 mm) at the terminal end 28. The distance from the bottom of terminal end 28 to the bottom of housing 12 was approximately 26 in. Housing 12 was provided with 80 longitudinal radially extending fins surrounding its outer periphery to assist in heat transfer with a stream of air which was passed over the outer surfaces of housing 12.

Liquid sodium at a temperature of from 380° to 240° C. and containing from 86 to 57 ppm sodium oxide was introduced through the inlets of varying flow rates of from about 9.0 to 24.5 gpm. A sufficient amount of cooling air was passed over the housing containing the hot sodium to insure that the sodium temperature upon reaching terminal end 28 of conduit member 18 was within the range of from about 100° to 210° C. About 5300 gallons of sodium were circulated through the device during each test and it was found that the apparatus constructed in accordance with the present invention was capable of reducing the metal oxide content to as low as 1 ppm at average oxide trapping rates of from 1.25 ppm to 2.0 ppm per hour. Rates as high as 5.4 ppm per hour were achieved during the initial portions of the test without any evidence of plugging. These these tests demonstrate the ability of the present invention to remove oxides without a mesh. Further, prior art devices require low removal rates (approximately 0.1 ppm per hour) to prevent premature plugging, whereas the present invention provides removal rates more than an order of magnitude higher. Further, the present invention obviates the five-minute residence time requirement heretofore believed to be essential.

What is claimed is:

1. An apparatus for removing oxide impurities from a liquid alkali metal comprising:
    a housing having top and bottom ends;
    inlet means adjacent the top end of said housing for introducing a liquid alkali metal containing oxide impurities into said housing;
    a conduit member located in said housing having a discharge end and a terminal end, said conduit member and said housing forming an annular flow path for said liquid alkali metal, said terminal end of said conduit member and said housing forming an annular flow path of gradually reduced cross-sectional flow area and terminating in a substantially increased cross-sectional flow area defined by said housing to provide a substantial change in the velocity head of liquid alkali metal flowing therethrough to form crystals of the oxide, said conduit having an interior portion defining an inner fluid passageway and at least the portion of said inner fluid passageway adjacent the terminal end of said conduit having a cross-sectional flow area sufficiently large to ensure that the flow of liquid alkali metal therethrough has a velocity of less than that which would carry entrained oxide crystals;
    outlet means for the withdrawal of liquid alkali metal from the discharge end of said conduit; and
    cooling means for cooling liquid alkali metal, passing through said annular passageway defined by said housing and said conduit, to a temperature within a desired range.

2. The apparatus of claim 1 further comprising a baffle means located in said housing adjacent the bottom end and spaced apart from the terminal end of said conduit member a sufficient distance to provide a flow stagnation zone for the crystallization and precipitation of oxide impurities, said baffle further providing for the retention of said oxide impurities.

3. The apparatus of claim 1 wherein said liquid alkali metal introduced into said housing is in indirect heat exchange relationship with the liquid alkali metal passing through the interior portion of said conduit.

4. The apparatus of claim 1 wherein said cooling means comprise a chamber surrounding said housing, said chamber being provided with means for passing a cooling fluid through the chamber.

5. The apparatus of claim 4 wherein said cooling fluid is introduced adjacent the lower end of said chamber and housing and withdrawn from the top.

6. The apparatus of claim 1 wherein said housing is provided with a plurality of longitudinal radially extending fins to enhance the transfer of heat from the liquid alkali metal to the cooling fluid.

7. The apparatus of claim 6 wherein said cooling fluid is air.

8. A method of removing metal oxide impurities from a liquid alkali metal comprising:
    providing a housing having a conduit member located therein, said conduit member and said housing forming an annular flow path, having upstream and downstream ends, for said liquid alkali metal;
    introducing said liquid alkali metal into said annular flow path;
    passing a cooling fluid in indirect heat exchange relationship with said liquid alkali metal flowing through said annular flow path in an amount sufficient to cool the alkali metal to a desired temperature;
    providing an abrupt increase in the cross-sectional flow area at the downstream end to cause a large change in the velocity of the liquid alkali metal and enhance nucleation and precipitation of metal oxide crystals;
    providing sufficient length and volume in said housing at the end of said annular flow path to reduce the velocity of the alkali metal to less than that which would carry entrained oxide crystals;
    passing said liquid alkali metal of reduced velocity through said conduit member and in indirect heat exchange relationship with the alkali metal introduced into the housing; and
    withdrawing said liquid alkali metal of substantially reduced metal oxide content.

9. The method of claim 8 wherein said cooling fluid is air.

* * * * *